Aug. 16, 1955
A. HALLUM
2,715,297
SEED WARMER AND STARTER
Filed April 14, 1953
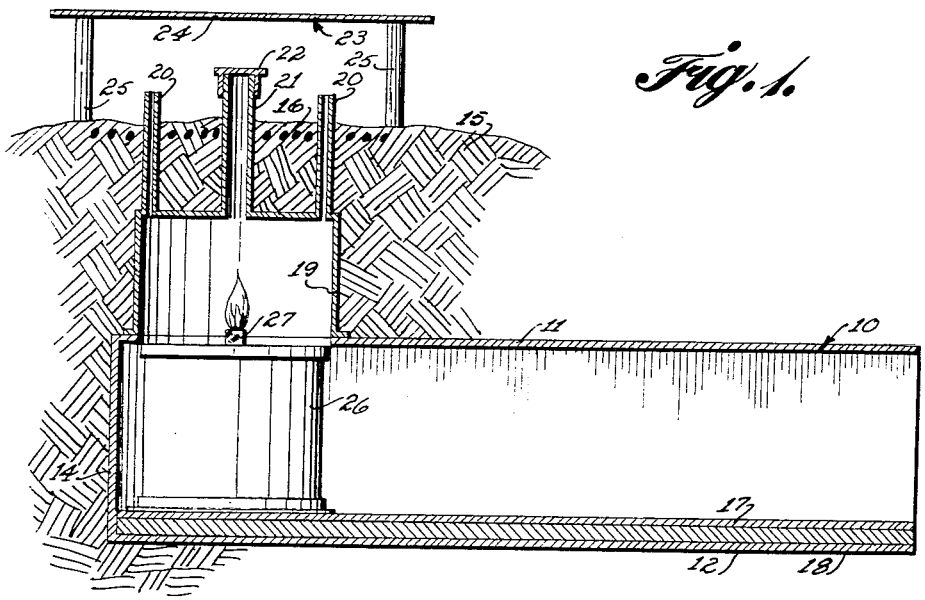
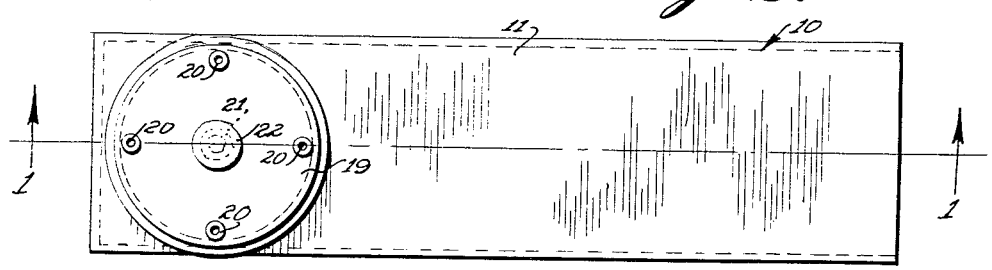
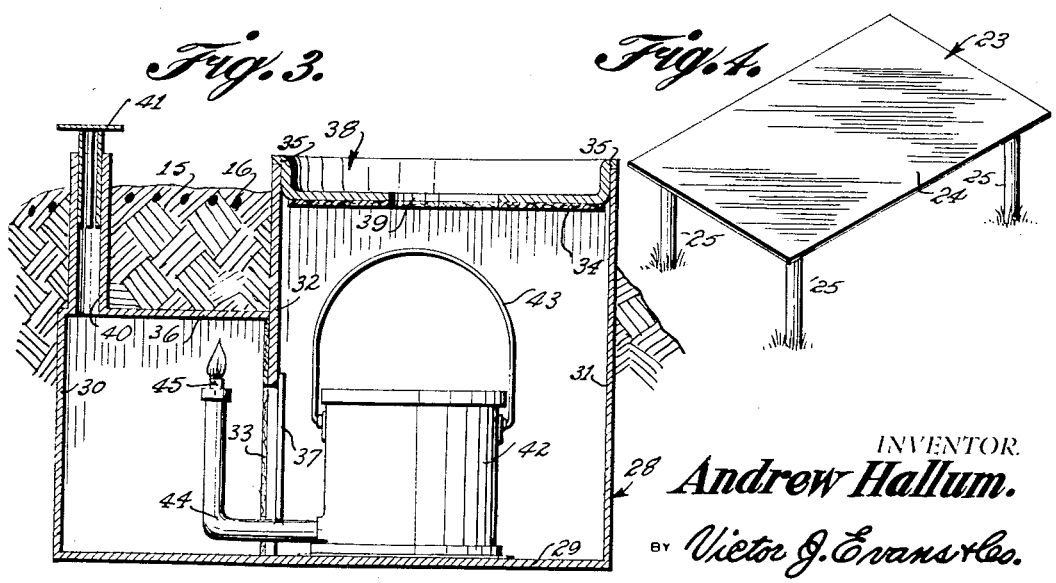
INVENTOR.
Andrew Hallum.
BY Victor J. Evans & Co.
ATTORNEYS

2,715,297

SEED WARMER AND STARTER

Andrew Hallum, Springfield, Mo.

Application April 14, 1953, Serial No. 348,669

2 Claims. (Cl. 47—19)

This invention relates to a heater or warmer, and more particularly to a device for warming the ground containing young melon seeds.

The object of the invention is to provide a heater which is adapted to be embedded in the ground that contains a plurality of seeds, such as melon seeds, whereby growth of the seeds will be facilitated.

Another object of the invention is to provide a heating device which will permit melon plants or seeds to get the benefit of the warmth from the sun's rays as well as the heat from the heating device, the device being constructed so that there will be an economy in heating and there being provided a reflector for directing the heat back to the ground.

A further object of the invention is to provide a heater which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a longitudinal sectional view taken through the heater of the present invention.

Figure 2 is a top plan view of the heater.

Figure 3 is a longitudinal sectional view showing a modified heater.

Figure 4 is a perspective view of a reflector.

Referring in detail to Figures 1, 2 and 4 of the drawings, the numeral 10 designates a housing which may be fabricated of any suitable material such as metal, and the housing 10 has a horizontally disposed top wall 11 and a horizontally disposed bottom wall 12. The housing 10 further includes an end wall 14, and the outer end of the housing 10 is open. The numeral 15 designates a portion of the ground or earth in which the housing 10 is embedded, and the numeral 16 designates seeds which may be melon seeds that are in the ground 15. The heater of the present invention provides sufficient heat to facilitate growth of the seeds 16 and to prevent damage to the seeds 16 from frost or other adverse weather conditions.

Extending longitudinally through the housing 10 and positioned on the bottom wall 12 is a pair of horizontally disposed panels 17 and 18. Extending upwardly from the inner end of the housing 10 and secured thereto is a casing 19 which defines a chamber therein. A plurality of pipes or vertically disposed conduits 20 and 21 extend upwardly from the top of the casing 19 whereby the products of combustion from the burner can pass therethrough. A cap or plug 22 may be detachably mounted on the upper end of the center pipe 21.

A means is provided for deflecting the heat that issues from the top of the pipes 20 and 21 back towards the seeds 16 so that the heater will operate with maximum efficiency. This means comprises a reflector 23 which includes a horizontally disposed top plate 24 that has secured thereto a pair of spaced parallel vertically disposed legs 25 which engage the ground 15.

Removably mounted on the inner ends of the panels 17 and 18 is a burner 26 which may have a suitable quantity of fuel therein. A wick 27 extends upwardly from the top of the burner 26.

Referring to Figure 3 there is shown a modified heater wherein the housing 28 is embedded in the ground 15 having the growing melon seeds 16 therein. The housing 28 includes a horizontally disposed bottom wall 29 and end walls 30 and 31. There is further provided an upper wall 36 which extends over a part of the bottom wall 29 and a partition 32 is vertically disposed and extends downwardly into the housing 28. Suitable insulation such as asbestos 33 may be arranged on one side of the partition 32 adjacent its lower end. A cap or lid 38 having insulation 34 on its inner surface is detachably mounted on the upper end of the housing 28, and the cap 38 is provided with a central opening 39 which defines a hand hold and air inlet, there being a rim 35 on the cap 38. A vertically disposed pipe or conduit 40 extends upwardly from the housing 28 for the passage therethrough of the hot products of combustion, and a plug or cap 41 may be detachably mounted on the upper end of the conduit 40. A plate 37 may be secured to the tube 44 for engaging a portion of the partition 32.

Supported on the panels 35 and 37 is a burner 42 which is adapted to hold a quantity of fuel therein, and a bail or handle 43 is secured to the burner 42 for facilitating the manual movement or placement of the burner. An L-shaped tube 44 extends from the burner 42 and has a wick 45 mounted on an end thereof.

From the foregoing it is apparent that a device has been provided which will supply heat to a hill or soil 15 in which seeds 16 are placed. Thus, the growth of watermelons and the like will be expedited and the seeds 16 will not be affected by frost or cold weather especially during the incubation period of the seeds. The plug 22 on the pipe 21 will help to save heat and by removing the plug 22 the fire within the casing 19 can be inspected. The pipes 20 and 21 may be made of iron so that heat will be conducted readily therethrough to warm the soil therearound. Also, the cap 38 will help to conserve heat in the housing 28 and the handle 43 facilitates the carrying and placement of the burner 42. The reflector shown in Figure 4 and indicated by the numeral 23 will deflect some of the heat back to the ground or seed and a burlap may be used for covering up the reflector 23 in cold weather to also save heat. Further, the reflector may be circular instead of rectangular. The reflector can be moved as desired. In the construction shown in Figure 3, air will be prevented from passing in the wrong direction and the parts can be easily assembled or disassembled. The cap 38 is constructed so that there will be a minimum loss of heat and the asbestos 34 also serves to prevent loss of heat.

I claim:

1. A heating device comprising a housing including a horizontally disposed bottom wall and a horizontally disposed top wall, spaced parallel vertically disposed end walls, a vertically disposed partition extending down into said housing and defining a chamber therein, a layer of insulation arranged on a portion of said partition, a vertically disposed conduit extending upwardly from said chamber, a cap mounted on the upper end of said conduit, a lid mounted on said housing and provided with an opening therein, and a burner having an L-shaped tube extending therefrom mounted in said housing, and a wick extending from said tube and positioned in said chamber, there being a bail connected to said burner.

2. In a seed warmer and starter, a housing embedded in ground, said housing including a horizontally disposed bottom wall and spaced parallel vertically disposed end walls, a top wall extending over a portion of said bottom wall, a vertically disposed partition extending downwardly into said housing, insulation arranged on one side of said partition adjacent its lower end, a cap having insulation on its lower surface detachably mounted on the upper end of said housing, said cap being provided with a central opening, an upstanding rim on said cap, a vertically disposed conduit extending upwardly from said housing, a plug detachably mounted on the upper end of said conduit, a burner supported in said housing, a handle connected to said burner, an L-shaped tube extending from said burner and having a wick mounted on an end thereof, and a plate secured to said tube for engaging a portion of said partition.

References Cited in the file of this patent

UNITED STATES PATENTS

| | | |
|---|---|---|
| 378,512 | Marshall | Feb. 28, 1888 |
| 1,520,605 | Sheer | Dec. 23, 1924 |
| 2,609,641 | Hallum | Sept. 9, 1952 |

FOREIGN PATENTS

| | | |
|---|---|---|
| 27,488 | Great Britain | Dec. 3, 1906 |